United States Patent Office 3,186,388
Patented June 1, 1965

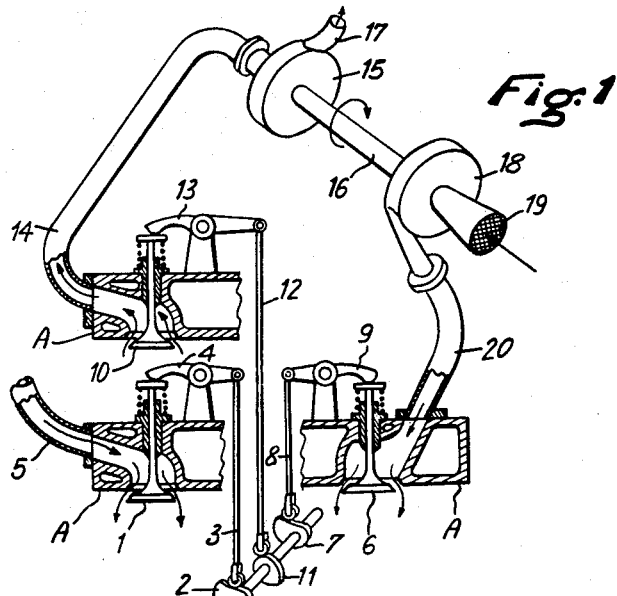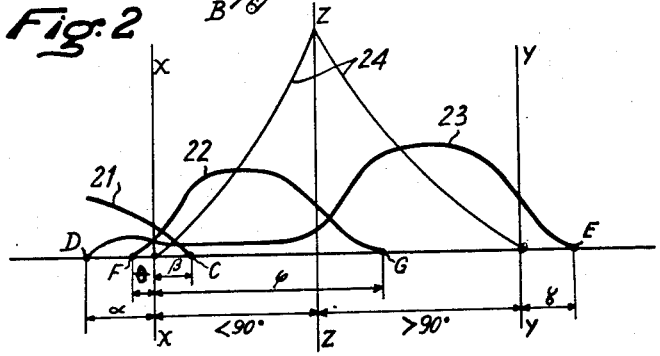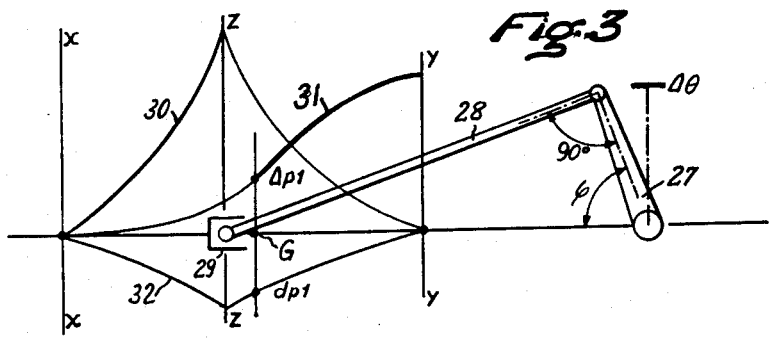

3,186,388
FEEDING OF AIR FOR COMBUSTION IN SUPERCHARGED INTERNAL COMBUSTION ENGINES
Constant Bricout, Paris, France, assignor to Les Applications Techniques Industrielles L.A.T.I., Paris, France, a corporation of France
Filed Sept. 10, 1963, Ser. No. 307,980
Claims priority, application France, Sept. 10, 1962, PV 908,989
2 Claims. (Cl. 123—75)

Supercharging of internal combustion engines consists of compressing the air before its admission into the cylinder either by a turbo compressor actuated by the kinetic energy of the exhaust gases, or by a compressor driven mechanically by the engine.

These methods are well-known. They improve the efficiency of internal combustion engines, but have, on the other hand, several drawbacks. Thus, it has been found to be necessary to interpose a cooling element between the compressor and the pressure piping. This causes an overcrowding of auxiliary devices relating to the supercharging equipment and also adds to the costs thereof.

For the purpose of minimizing this drawback, it has been proposed to feed the internal combustion engine from two sources of air: one is compressed air delivered by a suitable compressor, while the other source is fresh air admitted to the cylinders by means of normal operational suction. Such an arrangement makes possible the elimination of the cooling element, reduces the importance of the compressor, decreases the number of devices previously required, thus lowering the over-all expenses.

Such aforementioned arrangements, however, have not provided all of the desirable results capable of being attained.

In the known arrangements, the valve admitting fresh air by natural suction opens at the upper dead center and closes when the pressure of air in the cylinder is approximately equal to the atmospheric pressure. The valve admitting compressed air opens somewhat before the closing of the valve admitting fresh air and closes after the dead center has been reached.

Accordingly, fresh air is admitter only during approximately one-half of the traveling time of the piston. Thus, it fills only half the volume of the cylinder and limits, therefore, the rate of supercharging to a relatively low value. One could, of course, obviate this drawback by opening the valve of compressed air during the intake of fresh air. This solution, however, is not practical since there appears a scavenging effect of the fresh air across its own valve of admission at periods between the opening of the valve admitting the compressed air and the closing of the valve admitting fresh air. This scavenging effect is aggravated by the suction created by the feeding flux of the cylinders not in phase.

It has been found that in order to prevent the scavenging of fresh air by the compressed air, it is sufficient to insure that the two volumes admitted simultaneously be substantially equal.

The invention relates to an internal combustion engine, each cylinder of which is provided with two air feeding sources. One delivers compressed air furnished by a suitable compressor, while the other one delivers fresh air by means of normal suction. Each source discharges air into the cylinder through a valve, and at least one of the air currents contains carburated fuel. The control means for the valves of each cylinder are driven in such a manner that the valve admitting compressed air opens not later than simultaneously with the valve admitting fresh air, and it is prerequisite that these two valve opening operations take place before they attain upper dead center. Furthermore, at least during the totally open phase of the fresh air valve, the simultaneously admitted volumes from the two feeding sources should be substantially equal when considered at the pressure present in the cylinder. Also, the fresh air valve should close at the moment when the intake vacuum of the fresh air at the valve neck is substantially equal to, but preferably slightly larger than, the pressure inside the cylinder.

Such a timing of air admission has several advantages. During the period between the opening of the valve admitting compressed air and prior to the piston attaining its upper dead center, the compressed air scavenges the exhaust gases and, furthermore, cools them. This increases the efficiency of the turbo compressor, which, as mentioned before, is driven by the exhaust gases.

Beginning at dead center, that is, when the fresh air valve has already begun its fast opening, the valve admitting the compressed air is partially closed, thus limiting the admission of compressed air through an angle of crankshaft travel which is variable as a function of the desired rate of supercharging. The residual opening is computed in such a manner that the two volumes admitted are substantially equal for the purpose of avoiding the scavenging of the fresh air.

The valve admitting fresh air closes at the moment when the air intake vacuum at its neck is substantially equal to, but preferably slightly greater than, the pressure inside the cylinder. In that moment, however, the valve admitting pressured air is already open to some extent which permits obtaining a rate of supercharging superior to that of the known devices. The rate of supercharging is varied by changing the position of the point of inflection of the valve lift diagram relating to the valve admitting compressed air with respect to the point of total closure relating to the valve admitting fresh air.

An embodiment of the invention is shown in an exemplary manner in the drawing wherein:

FIG. 1 is a schematic representation of feeding air to one cylinder through a single cylinder head;

FIG. 2 illustrates an example of the law relating to lifting the valves admitting the air and relating to the delivery; and FIG. 3 is a schematic diagram relating to the variations of pressure and vacuum inside the cylinder.

It is to be noted that the illustrated curves are only of exemplary nature. Their general course, and more particularly their relative positions, has to vary as a function of the law of charging determined by the rate of supercharging.

Referring now to FIG. 1 there is shown in a schematic representation the valving of one cylinder by means of an arrangement comprising a turbo compressor driven by the kinetic energy of the exhaust gases. The engine is provided with cylinder heads A each including a valve 1 for sucking fresh natural air, a valve 6 for charging the cylinder with air under pressure and an exhaust valve 10. A cam shaft B driven by the engine functions in the normal manner and assures the distribution of each engine cycle. Valve 1 is actuated by cam 2 through push rod 3 and rocker arm 4. The hose shown at 5 handles the delivery of the fresh air to valve 1. Valve 6 is actuated by cam 7 through push rod 8 and rocker arm 9. The hose shown at 20 assures the delivery of the compressed air to valve 6. At least one of the air currents in hoses 5 and 20 contains carburated fuel added in a conventional manner not shown. Valve 10 is actuated by cam 11 through push rod 12 and rocker arm 13. The exhaust gases are collected by the hose 14. The kinetic energy of the exhaust gases drives turbine 15 provided with an output shaft 16. The exhaust gases are discharged from the turbine at the outlet 17. Shaft 16, in turn, drives compressor 18, the air intake of which is shown at 19. The compressed air output is delivered to the cylinder head A through hose 20.

In FIG. 2 there are shown the lift curves of valves 1, 6 and 10, or, in other words, the law of lift regarding cams 2, 7 and 11.

In FIG. 2 the abscissa represents the values of the angle between the crankshaft and the axis of the cylinder. The axis X—X represents the value of the upper dead center or the start of suction and the end of exhaust of the preceding cycle. Y—Y represents the lower dead center or the end of suction and the beginning of compression. Axis Z—Z represents the point where the velocity of the piston is at its maximum and, consequently, the vacuum at the neck of the admission valves is also at its maximum. This point corresponds to an angle of less than 90 degrees between the crankshaft and the axis of the cylinder. It is approximately 76 degrees in case of a ratio of 4:1 between the length of the piston rod and that of the crank.

The opening of the exhaust valve is identical to that in a conventional motor. The end of its lift is represented by curve 21 terminating at point C for which corresponds an angle $\beta$ after the upper dead center. Curve 23 represents the law of lift regarding the valve admitting compressed air. This valve opens at point D or at an angle $\alpha$ before the upper dead center X—X and closes at point E or at an angle $\gamma$ after the lower dead center Y—Y. Curve 22 represents the law of lift regarding the valve for admitting fresh air. This valve opens at F or at an angle $\theta$ before the upper dead center so that $\theta<\alpha$, and closes at point G at an angle $\phi$ after the upper dead center where the vacuum at the neck of this valve is substantially equal to, but preferably very slightly greater than, the pressure in the cylinder. Curve 24 represents the linear velocity of the piston between the two dead centers.

As it was noted hereinbefore, the compressed air scavenges the exhaust gases between D and X—X and at the same time cools them. Between X—X and the inflection of curve 23 the fresh air is sucked in with the valve fully open while the admission of the compressed air is limited in such a manner that the two admitted volumes are substantially equal for the purpose of avoiding the scavenging of the fresh air. At point G the fresh air valve is completely closed and from there on only compressed air is admitted until point E which is somewhat after the lower dead center.

By changing the relative positions of the inflection point of curve 23 and point G, a variation of the rate of supercharging may be obtained for a given working pressure of the compressor.

Referring now to FIG. 3, there are shown, as a function of the angle between the crankshaft and the axis of the cylinder, a curve 30 representing the linear velocity of the piston, a curve 31 representing the internal pressure of the cylinder and a curve 32 representing the vacuum at the neck of the valve 1 admitting fresh air.

Similarly to FIG. 2 axis X—X represents the upper dead center, axis Y—Y illustrates the location of the lower dead center, while axis Z—Z shows the point where the piston rod and the crankshaft have an angle of 90°.

In FIG. 3 there is shown schematically a crank 27 to which there is attached a piston rod 28 which moves piston 29.

The closing of valve 1 admitting fresh air happens at G where the vacuum $dp_1$ at the neck of the valve is approximately equal to pressure $\Delta p_1$ inside the cylinder.

Although but one embodiment of the invention has been depicted and described, it will be apparent that this embodiment is illustrative in nature and that a number of modifications in the apparatus and variations in its end use may be effected without departing from the spirit or scope of the invention as defined in the appended claims.

What I claim is:

1. In an internal combustion engine of the type including at least one cylinder having a piston therein, a crankshaft, a cam shaft, push rods, driving gear associated with said cam shaft, rocker arms actuated thereby, and suitable intake and exhaust valves associated with each cylinder and actuated by said rocker arms, the combination with said engine comprising a first intake valve disposed in each of said cylinders for introducing pressurized air thereto, a second intake valve disposed in each of said cylinders for introducing atmospheric air thereto, at least one of said air currents containing carburated fuel, means opening said first intake valve not later than simultaneously with said second intake valve before said piston attains its upper dead center prior to its suction stroke, means closing said second valve when the intake vacuum of the atmospheric air at the neck of said second valve substantially equals the pressure within said cylinder, means closing said first valve after the completion of said suction stroke and means insuring the admission of pressurized air and atmospheric air in substantially equal volumes at least for the period when said second valve is in a fully opened position.

2. The combination as defined in claim 1, wherein said means insuring the admission of pressurized air and atmospheric air in substantially equal volumes includes means partially closing said second valve after said piston has passed its upper dead center to begin its suction stroke.

References Cited by the Examiner

UNITED STATES PATENTS

| 1,927,368 | 9/33 | Kjaer | 123—76 |
| 2,940,432 | 6/60 | Hijszeler | 123—76 |

FOREIGN PATENTS

| 298,128 | 9/29 | Great Britain. |

FRED E. ENGELTHALER, *Primary Examiner.*